US010073897B2

(12) United States Patent
Brown et al.

(10) Patent No.: US 10,073,897 B2
(45) Date of Patent: Sep. 11, 2018

(54) TRANSFORMING TIMESERIES AND NON-RELATIONAL DATA TO RELATIONAL FOR COMPLEX AND ANALYTICAL QUERY PROCESSING

(71) Applicant: International Business Machines Corporation, Armonk, NY (US)

(72) Inventors: Kevin Brown, San Rafael, CA (US); Frederick C. Ho, Campbell, CA (US); Raghupathi K. Murthy, Union City, CA (US); Karl Ostner, St. Wolfgang (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/363,005

(22) Filed: Nov. 29, 2016

(65) Prior Publication Data
US 2017/0075968 A1   Mar. 16, 2017

Related U.S. Application Data

(63) Continuation of application No. 14/153,904, filed on Jan. 13, 2014, now Pat. No. 9,529,875.

(51) Int. Cl.
G06F 17/30 (2006.01)

(52) U.S. Cl.
CPC .. *G06F 17/30563* (2013.01); *G06F 17/30442* (2013.01); *G06F 17/30486* (2013.01); *G06F 17/30592* (2013.01); *G06F 17/30312* (2013.01)

(58) Field of Classification Search
CPC .................................................. G06F 17/30312
See application file for complete search history.

(56) References Cited

U.S. PATENT DOCUMENTS

| | | | |
|---|---|---|---|
| 7,225,103 B2 | 5/2007 | Beresniewicz et al. |
| 7,924,283 B1 | 4/2011 | Hao et al. |
| 8,271,566 B2 | 9/2012 | Droz et al. |
| 2007/0005297 A1 | 1/2007 | Beresniewicz et al. |
| 2007/0027904 A1 | 2/2007 | Chow et al. |
| 2013/0066882 A1 | 3/2013 | Westbrooke |
| 2013/0091266 A1 | 4/2013 | Bhave et al. |
| 2013/0103657 A1 | 4/2013 | Ikawa et al. |
| 2013/0238619 A1 | 9/2013 | Hanaoka et al. |

*Primary Examiner* — Hung Q Pham
(74) *Attorney, Agent, or Firm* — North Shore Patents, P.C.; Michele Liu Baillie (57) ABSTRACT

A system for transforming time series data into data that is accessible by a data warehouse identifies a data table comprising the time series data. The system creates a virtual view of the data table where the time series data is represented as at least one standard relational table in the virtual view, where the virtual view is presented as a virtual table. The system partitions the virtual table into a plurality of virtual partitions according to a time interval. The virtual table is partitioned across a data time range, where the data time range comprises at least one time interval, and where each of the plurality of virtual partitions has a respective partition time range that spans the time interval. The virtual partitions are created to optimize loading of the data into the data warehouse by incrementally refreshing the data according to the respective partition time range.

23 Claims, 5 Drawing Sheets

Table grows ➡

TRANSFORMING TIMESERIES AND NON-RELATIONAL DATA TO RELATIONAL FOR COMPLEX AND ANALYTICAL QUERY PROCESSING

BACKGROUND

Relational databases are often used to collect and manage large amounts of data. For data that is collected often, where the data in the database grows quickly, such as stock market data, utility meters (i.e., collecting utility usage by customers), etc., time series databases may provide a better solution. In a relational database, a new row is added as data is collected. In a time series data, an array in a row grows larger as data is collected instead of adding a new row. However, extracting and analyzing time series data using a data warehouse is difficult since not all database tools can manage time series data.

SUMMARY

According to one embodiment of the present invention, in a method for transforming time series data into data that is accessible by a data warehouse, implemented by a computing processor, the processor identifies a data table comprising the time series data. The processor creates a virtual view of the data table. The time series data is represented as at least one standard relational table in the virtual view, where the virtual view presented as a virtual table. The processor partitions the virtual table into a plurality of virtual partitions according to a time interval. The virtual table is partitioned across a data time range, where the data time range comprises at least one time interval. Each of the plurality of virtual partitions has a respective partition time range that spans the time interval, and the virtual partitions are created to optimize loading of the data into the data warehouse by incrementally refreshing the data according to the respective partition time range. The processor provides the plurality of virtual partitions to the data warehouse for analysis of the data via a data accelerator. The selection of the plurality of virtual partitions, based on the data time range, optimizes analysis of the data.

In one aspect of embodiments disclosed herein, when the method partitions the virtual table into the plurality of virtual partitions according to the time interval, the method incrementally refreshes the data by extracting new time series data from the data table, according to the time interval. The method creates a new virtual partition that spans the time interval, where the new virtual partition has the respective partition time range. The method adds the new virtual partition to the plurality of virtual partitions.

In one aspect of embodiments disclosed herein, when the method partitions the virtual table into the plurality of virtual partitions according to the time interval, the method incrementally refreshes the data by identifying the data time range as representing a chosen view of the data. The chosen view comprises a subset of the plurality of virtual partitions, where each of the subset of the plurality of virtual partitions has the respective partition time range that is within the data time range.

In one aspect of embodiments disclosed herein, when the method detects at least one virtual partition, within the subset of the plurality of virtual partitions, that has the respective partition time range outside of the data time range, the method removes the virtual partition from the subset of the plurality of virtual partitions. The virtual partition is then no longer represented within the chosen view.

In one aspect of embodiments disclosed herein, when the method detects at least one virtual partition that has the respective partition time range within the data time range, where the virtual partition is not in the subset of the plurality of virtual partitions, then method adds the virtual partition to the subset of the plurality of virtual partitions. The virtual partition is now represented within the chosen view.

In one aspect of embodiments disclosed herein, when the method partitions the virtual table into the plurality of virtual partitions according to the time interval, the method creates a partitioning calendar, and associates the time interval to the partitioning calendar. The method assigns the partitioning calendar to the virtual table, and partitions the virtual table, using the partitioning calendar, where each partition spans the time interval.

In one aspect of embodiments disclosed herein, when the method partitions the virtual table into the plurality of virtual partitions according to the time interval, the method defines a time window selected to optimize an amount of relevant data that is loaded into the data warehouse. The method associates the time interval to the time window, and applies the time window to the virtual table to partition the virtual table into the plurality of virtual partitions according to the time interval.

System and computer program products corresponding to the above-summarized methods are also described and claimed herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
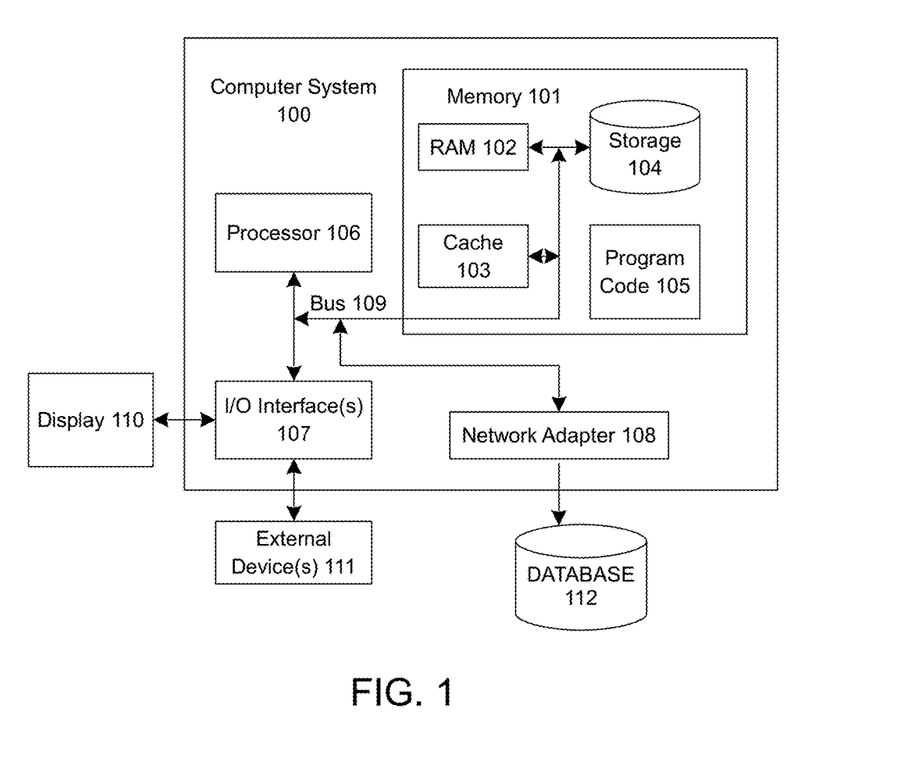
FIG. 1 illustrates an embodiment of a system for transforming time series data, according to embodiments disclosed herein.

FIG. 1 illustrates a system for transforming time series data into data that is accessible by a data warehouse according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more databases 112 via network adapter 108.

Figure 2A:
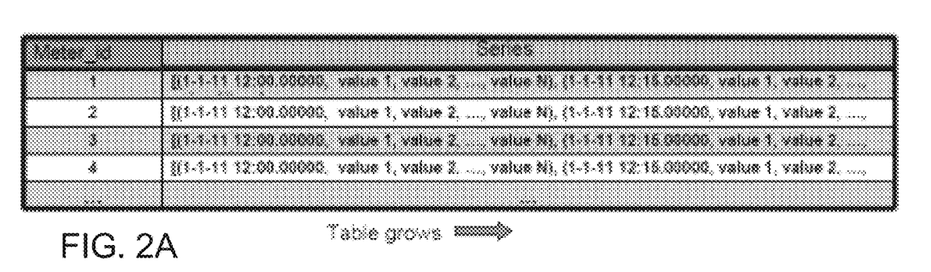
FIG. 2A and FIG. 2B illustrate example embodiments of a logical view of data in a time series data, and time series data flattened into a virtual view of a standard table schema.
Figure 2B:
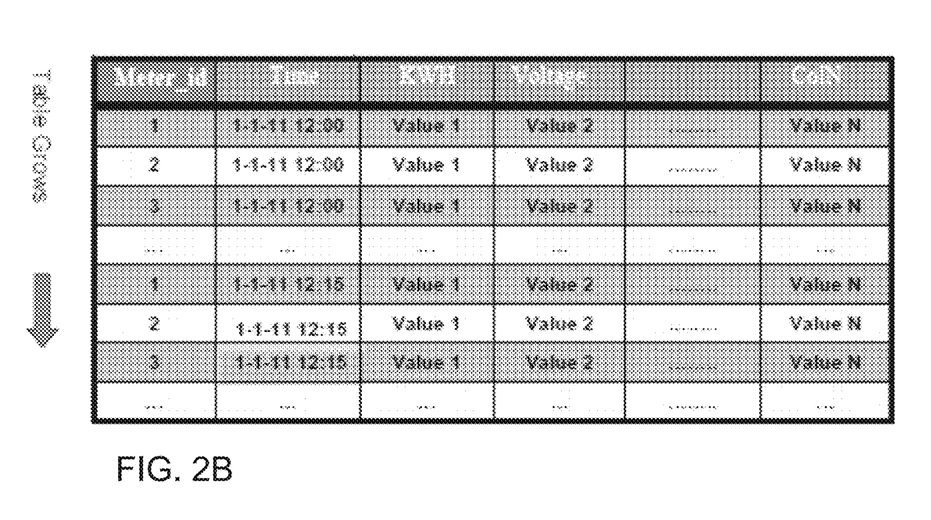

FIG. 2A illustrates an example embodiment of a logical view of data in a time series table. The table comprises a column that represents the Meter_id associated with a meter that collects data, and a column, "Series", that represents the data collected with respect to the Meter_Id. The "Series" column contains an array of data, where the array grows over the course of time by adding collected data (i.e., data items comprised of multiple variables) to the array, along with the respective timestamps. FIG. 2B illustrates an example embodiment of the data in the time series table of FIG. 2A flattened into a virtual view of a standard table schema, while maintaining the respective timestamps. In FIG. 2B, rows are added to the table as the data increases over the course of time. It is the timestamps in the time series data (as illustrated in FIG. 2A) that are important, for example, when representing the time series data as a virtual view of a standard table schema (as illustrated in FIG. 2B). Whereas in FIG. 2A, the array in each row grew as data was added, in FIG. 2B, a new row is added as the data grows. Each row contains a column for "Meter_id" and a column for each of the variables that were previously contained within each data item added to the array.

Figure 3A:
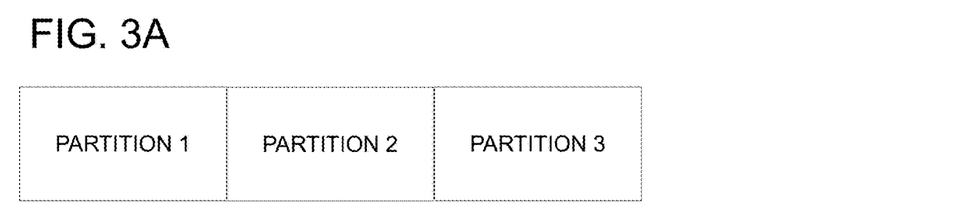
FIG. 3A and FIG. 3B illustrate example embodiments of virtual partitions.
Figure 3B:
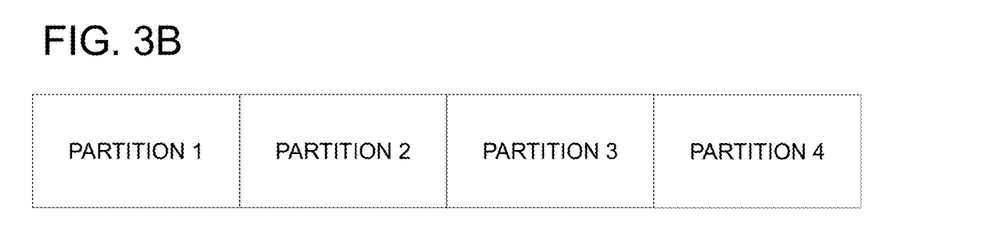

FIG. 3A, and FIG. 3B illustrate example embodiments of virtual partitions. FIG. 3A illustrates an example embodiment of a plurality of virtual partitions comprising Partition 1, Partition 2, and Partition 3. FIG. 3B illustrates an example embodiment as data is added to the plurality of virtual partitions illustrated in FIG. 3A. In FIG. 3B, as new data is added to the data table, the method extracts the new data, and creates a new partition, Partition 4, which is added to the plurality of partitions illustrated in FIG. 3A.

Figure 4A:
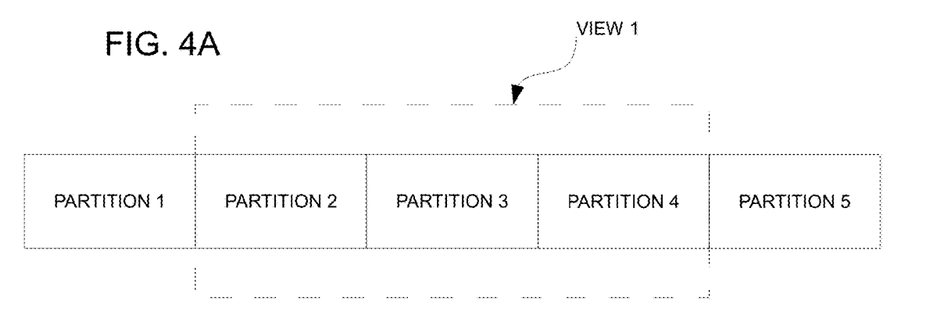
FIG. 4A and FIG. 4B illustrate example embodiments of a plurality of virtual partitions, each with a chosen view.
Figure 4B:
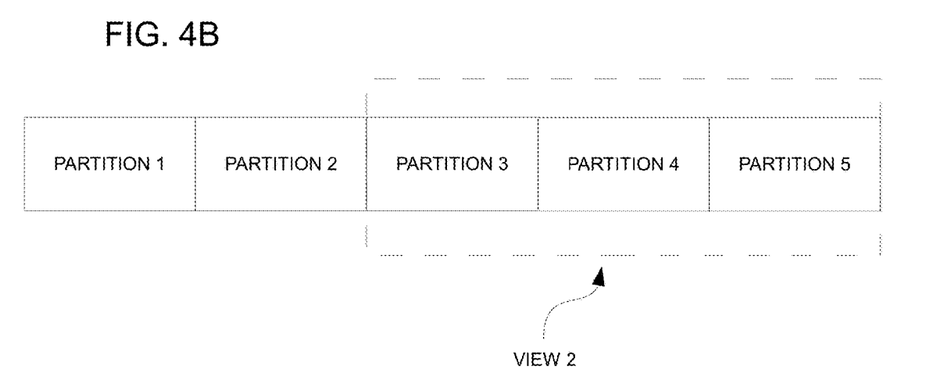

FIG. 4A and FIG. 4B illustrate an example embodiment of a plurality of virtual partitions, each with a chosen view. FIG. 4A illustrates Partition 1 through Partition 5 where the chosen view, View 1, spans Partition 2 through Partition 4. FIG. 4B illustrates Partition 1 through Partition 5 where the chosen view, View 2, spans Partition 3 through Partition 5.

Figure 5:
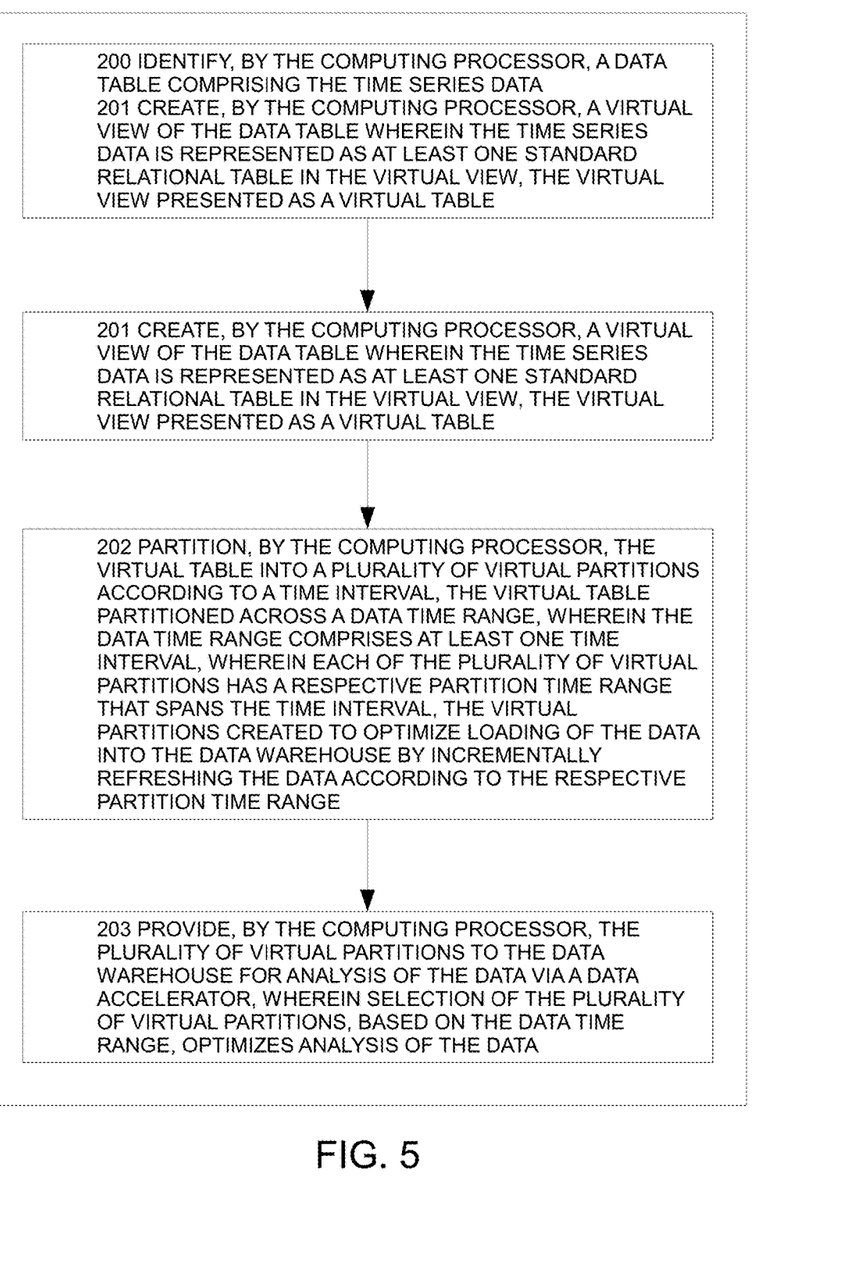
FIG. 5 is a flowchart illustrating an embodiment of a method for transforming time series data, according to embodiments disclosed herein.

FIG. 5 illustrates an embodiment of a method for transforming time series data. At 200, the method, via the processor, identifies a data table comprising the time series data. FIG. 2A illustrates an example embodiment of a logical view of time series data. The time series data may represent data that grows quickly over time, such as meter readings, stock market data, etc.

At 201, the method, via the processor, creates a virtual view (i.e., a virtual table interface) of the data table where the time series data is represented as at least one standard relational table in the virtual view, where the virtual view is presented as a virtual table. In an example embodiment, the time series data is represented as standard relational tables. This is a virtual view, meaning the data is stored only once, instead of storing the data once as a time series table, and then storing it a second time as standard relational table. In other words, the method transforms an existing time series storage structure into an in-memory storage structure without any intermediate storage.

Additionally, converting a time series database table into a standard relational database table causes a very large increase in space used to store the data, since each data item in the array becomes a separate row Millions of rows of time series data become billions of rows in standard relational database tables. Often, it is necessary to maintain all the data for compliance reasons, but the very large amounts of data collected is also useful for performing analytics on the data. Thus, creating a virtual view of the time series data represented as a standard relational table saves space in two ways; storing the data only once (as noted above), and storing the data as time series instead of converting it to a standard relational table. FIG. 2B illustrates an example embodiment of time series data represented in a virtual view. Using this virtual view, a user can access the time series data by issuing Structured Query Language (SQL) queries just as if the time series data were a standard relational database table, even if the data warehouse does not support time series data.

At 202, the method, via the processor, partitions the virtual table into a plurality of virtual partitions according to a time interval. With virtual partitions, the physical location of the time series data is not affected, but the time series data records are logically grouped. In an example embodiment, the time intervals of the partitions may be user defined. The virtual table is partitioned across a data time range, where the data time range comprises at least one time interval. Each of the plurality of virtual partitions has a respective partition time range that spans the time interval. The partition time ranges may be, for example, days, weeks, months, years, etc. By partitioning the data across a partition time range, the time series data may be grouped by time, for example, utility meter readings grouped by the day, month, or year. The virtual partitions are created to optimize loading of the data into the data warehouse by incrementally refreshing the data according to the respective partition time range. In an example embodiment, a utility company may want to display meter readings a year at a time, for example, a range of data spanning from a year ago today through today. If the data is partitioned by days, then the snapshot of a year's worth of data is displayed according to the virtual partitions (representing each day in the year) that represent the year's worth of data. That snapshot of a year's worth of meter readings changes every day. As each day changes, the window of data (i.e., a year worth of data) that is displayed changes by displaying the data according to the virtual partitions (i.e., those virtual partitions that span the appropriate time range).

At 203, the method, via the processor, provides the plurality of virtual partitions to the data warehouse for analysis of the data via a data accelerator. Selection of the plurality of virtual partitions, based on the data time range, optimizes analysis of the data. The method transforms three dimensional time series data, and performs "automatic virtual mapping" of the data from time series data into standard relational database data for efficient time cyclic data analysis and acceleration. The method enables time-range based data refresh without additional persistence. In an example embodiment, when a user wishes to view the times series data, for example, a year at a time, the method provides the plurality of partitions that represent that "year at a time" snapshot of data. For example, that "year at a time" snapshot of data may range from a year ago today through today. As the "year at a time" snapshot of data changes (meaning today's "year at a time" snapshot of data is different than yesterday's "year at a time" snapshot of data), and the data needs to be refreshed, the method refreshes only those virtual partitions that need to be refreshed. In other words, to change from displaying yesterday's yearly snapshot (i.e., ranging from a year ago yesterday through yesterday) to today's yearly snapshot (i.e., ranging from a year ago today through today), one virtual partition (representing today's daily data virtual partition) would be added, and one virtual partition (representing yesterday's daily data virtual partition) would be dropped. In example embodiment, snapshot of data may migrate or progress with a user-specified time period, without requiring a complete reload of all the data into the data warehouse.

When a virtual view is created of time series data, the data can be maintained on a data accelerator only as a whole. To update the time series data on the data accelerator, the data would need to be reloaded completely. When the time series data is virtually partitioned, the data may be incrementally refreshed on the data accelerator. A virtual partition in the data warehouse may be refreshed (i.e., partitions are dropped and reloaded in the data warehouse). In this scenario, the virtual partition may be identified either as numeric index, or as timestamp. Thus, the timestamps that are maintained within the time series data (as illustrated in FIG. 2A) are important, for example, during the partitioning of the virtual table.

In an example embodiment, when the method partitions the virtual table into the plurality of virtual partitions according to the time interval, the method incrementally refreshes the data by extracting new time series data from the data table, according to the time interval. For example, as data is added to the time series table, the method incrementally refreshes the data in the virtual view. The new time series data is extracted from the time series data table according to the time interval. The method then creates a new virtual partition that spans the time interval, where the new virtual partition has the respective partition time range. In other words, if the time series data is partitioned according to months, then the new time series data is also partitioned according to months, where each partition has a time range that begins at the beginning of a month and ends at the end of a month. The method then adds the new virtual partition to the plurality of virtual partitions as is illustrated in FIG. 3B, where Partition 4 is added to the plurality of partitions.

In an example embodiment, when the method partitions the virtual table into the plurality of virtual partitions according to the time interval, the method incrementally refreshes the data by identifying the data time range as representing a chosen view of the data, where the chosen view comprises a subset of the plurality of virtual partitions, and where each of the subset of the plurality of virtual partitions has the respective partition time range that is within the data time range. For example, a user may want to view only last month's data. The method identifies the data time range of the first of last month through the end of last month as representing the chosen view of the data. The chosen view comprises a subset of the plurality of virtual partitions where each of the virtual partitions in the subset has a respective partition time range that falls between the first of last month through the end of last month. FIG. 4A illustrates the chosen view, View 1, as comprising Partition 2 through Partition 4. In this example, each of Partition 2 through Partition 4 has a data time range that falls between the first of last month through the end of last month.

In an example embodiment, the method detects at least one virtual partition, within the subset of the plurality of virtual partitions, having the respective partition time range outside of the data time range, and removes the virtual partition from the subset of the plurality of virtual partitions, such that the virtual partition is no longer represented within the chosen view. For example, FIG. 4B illustrates an example embodiment where the method detects that virtual partition, Partition 2, has a respective partition time range outside of the data time range, and removes it from the chosen view, as illustrated in View 2.

In an example embodiment, the method detects at least one virtual partition having the respective partition time range within the data time range, where the virtual partition is not in the subset of the plurality of virtual partitions. The method adds the virtual partition to the subset of the plurality of virtual partitions, such that the virtual partition is now represented within the chosen view. For example, FIG. 4B illustrates an example embodiment where the method detects that virtual partition, Partition 5, has a respective partition time range within the data time range, where Partition 5 is not in the subset of the plurality of virtual partitions. The method adds Partition 5 to the chosen view, as illustrated in View 2. View 2 is now comprised of Partition 3 through Partition 5.

In an example embodiment, when the method partitions the virtual table into the plurality of virtual partitions according to the time interval, the method creates a partitioning calendar, and associates the time interval to the partitioning calendar. The method then assigns the partitioning calendar to the virtual table, and partitions the virtual table, using the partitioning calendar, where each partition spans the time interval. A partitioning calendar may be a regular time series calendar, and may typically have a much larger interval than a calendar used to define the time series itself. The interval length may depend on a user's granularity requirements to administer time series data on the data accelerator.

In an example embodiment, a specific interval on a time series calendar may be identified by its index (i.e., an integer value representing the n-th interval, where the calendar start timestamp represents interval 0). As the data accelerator maintains partitions as unsigned integers, the index values must be positive. Therefore, the partitioning calendar must start at least with the oldest time series data to be loaded into the data accelerator. In an example embodiment, no time series data earlier than the start timestamp of the partitioning calendar may be loaded to the accelerator.

In another example embodiment, a specific interval on a time series calendar can be identified by a timestamp. Using the calendar, the timestamp may be mapped to an index.

In an example embodiment, once the method assigns the partitioning calendar to the virtual table, the method partitions the virtual table virtual partitions. A partition may span a time window of one interval of the calendar.

In an example embodiment, when the method partitions the virtual table into the plurality of virtual partitions according to the time interval, the method defines a time window selected to optimize an amount of relevant data that is loaded into the data warehouse. Then method associates the time interval to the time window. The method applies the time window to the virtual table to partition the virtual table into the plurality of virtual partitions according to the time interval.

In an example embodiment, the method may define time windows by defining a specific index as the start of the time window, and another specific index as the end of the time window. The index refers to an interval in the partitioning calendar. The time window starts at the beginning of the interval defined by the start index (including the start index), and ends at the beginning of the interval defined by the end index (excluding the end index). The granularity of a time window is the length of the calendar interval. The time window is comprised of one or more adjacent intervals. When a new window is defined, it may not overlap with already existing windows. The time window may be defined by the begin index and end index, as well as timestamps. A time window specifies which subset of data is to be loaded into the data warehouse to optimize the relevant data that is loaded into the data warehouse. The method may define a time window by defining a specific index as the start of the window, and another specific index as the end of the window. For example, the data contained in the first week of every month may be relevant, whereas the data in the remaining weeks of each month might not be as relevant. Instead of loading all of the data for each month (when all of the monthly data is not necessary), a user may create a time window that specifies the first week of each month (that has a specific index as the beginning of the first week of the month and has another specific index as the end of the first week of the month). In this scenario, when the method provides a year's worth of virtual partitions to the data warehouse for analysis of the data via the data accelerator, the method only provides the first week of data for each month in the year.

In an example embodiment, a time window may be dropped. The method may drop a time window by receiving indication of the beginning of the time window, either by a numeric index or a timestamp.

In an example embodiment, the time window may be moved. The time window may be moved as a whole by a number of time intervals. If the number of intervals is greater than zero, the time windows are moved forward on the time line. If the number of intervals is less than zero, the time windows are moved backwards. The default number of intervals is 1.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for transforming data to be accessible by a data warehouse, implemented by a computing processor, the method comprising:
   identifying, by the computing processor, a non-relational time series database table comprising time series data, wherein the non-relational time series database table comprises a column containing an array of the time series data collected from at least one source, wherein as new time series data is collected from the at least one source, the new time series data is added to the array instead of adding a new row for the new time series data;
   creating, by the computing processor, a virtual view of the time series data in the non-relational time series database table by representing the time series data in the non-relational time series database table as a virtual relational database table, wherein the virtual view is stored as an in-memory storage structure without any intermediate storage, wherein the time series data is stored in the non-relational time series database table and not stored in a relational database table;
   receiving a request with a user defined time interval to view the time series data, wherein the request is an SQL request; and
   presenting a snapshot of the time series data, in response to the request, by partitioning, by the computing processor, the virtual relational database table into a plurality of virtual partitions according to the user defined time interval across a data time range, wherein each of the plurality of virtual partitions has a respective partition time range that spans the user defined time interval, the plurality of virtual partitions created to optimize loading of the time series data in the virtual view into the snapshot by incrementally refreshing corresponding time series data for a corresponding virtual partition within the data time range.

2. The method of claim 1 comprising:
   providing, by the computing processor, the plurality of virtual partitions to the snapshot for analysis of the time series data via a data accelerator, wherein selection of the plurality of virtual partitions, based on the data time range, optimizes analysis of the time series data.

3. The method of claim 1 wherein presenting the snapshot of the time series data, in response to the request, by partitioning, by the computing processor, the virtual relational database table into the plurality of virtual partitions according to the user defined time interval comprises:
   incrementally refreshing the corresponding time series data by extracting new time series data from the non-relational time series database table, according to the user defined time interval;
   creating a new virtual partition that spans the user defined time interval, the new virtual partition having a new respective partition time range; and
   adding the new virtual partition to the plurality of virtual partitions.

4. The method of claim 1 wherein presenting the snapshot of the time series data, in response to the request, by partitioning, by the computing processor, the virtual relational database table into the plurality of virtual partitions according to the user defined time interval comprises:
   incrementally refreshing the corresponding time series data by identifying the data time range as representing a chosen view of the time series data, wherein the chosen view comprises a subset of the plurality of virtual partitions, wherein each of the subset of the plurality of virtual partitions has a second respective partition time range that is within the data time range.

5. The method of claim 4 comprising:
   detecting a first virtual partition, within the subset of the plurality of virtual partitions, having a first partition time range outside of the data time range; and
   removing the first virtual partition from the subset of the plurality of virtual partitions, wherein the first virtual partition is no longer represented within the chosen view.

6. The method of claim 4 comprising:
   detecting a second virtual partition having a second partition time range within the data time range, wherein the second virtual partition is not in the subset of the plurality of virtual partitions; and adding the second virtual partition to the subset of the plurality of virtual partitions, wherein the second virtual partition is now represented within the chosen view.

7. The method of claim 1 wherein presenting the snapshot of the time series data, in response to the request, by partitioning, by the computing processor, the virtual relational database table into the plurality of virtual partitions according to the user defined time interval comprises:
creating a partitioning calendar;
associating the user defined time interval to the partitioning calendar;
assigning the partitioning calendar to the virtual relational database table; and
partitioning the virtual relational database table, using the partitioning calendar, wherein each partition spans the user defined time interval.

8. The method of claim 1 wherein presenting the snapshot of the time series data, in response to the request, by partitioning, by the computing processor, the virtual relational database table into the plurality of virtual partitions according to the user defined time interval comprises:
defining a time window selected to optimize an amount of relevant data that is loaded into the snapshot;
associating the user defined time interval to the time window; and
applying the time window to the virtual relational database table to partition the virtual table relational database into the plurality of virtual partitions according to the user defined time interval.

9. The method of claim 1, wherein the time series data in the non-relational time series database table is not accessible using relational database queries, wherein the method further comprises:
providing access to the time series data in the non-relational time series database table through the request issued for the virtual relational database table.

10. A computer program product for transforming data to be accessible by a data warehouse, the computer program product comprising:
a computer readable storage medium having computer readable program code embodied therewith, the program code executable by a processor to:
identify, by the computing processor, a non-relational time series database table comprising time series data, wherein the non-relational time series database table comprises a column containing an array of the time series data collected from at least one source, wherein as new time series data is collected from the at least one source, the new time series data is added to the array instead of adding a new row for the new time series data;
create, by the computing processor, a virtual view of the time series data in the non-relational time series database table by representing the time series data in the non-relational time series database table as a virtual relational database table, wherein the virtual view is stored as an in-memory storage structure without any intermediate storage, wherein the time series data is stored in the non-relational time series database table and not stored in a relational database table;
receive a request with a user defined time interval to view the time series data, wherein the request is an SQL request; and
present a snapshot of the time series data, in response to the request, by partitioning, by the computing processor, the virtual relational database table into a plurality of virtual partitions according to the user defined time interval across a data time range, wherein each of the plurality of virtual partitions has a respective partition time range that spans the user defined time interval, the plurality of virtual partitions created to optimize loading of the time series data in the virtual view into the snapshot by incrementally refreshing corresponding time series data for a corresponding virtual partition within the data time range.

11. The computer program product of claim 10 wherein the computer readable program code is further configured to:
provide, by the computing processor, the plurality of virtual partitions to the snapshot for analysis of the time series data via a data accelerator, wherein selection of the plurality of virtual partitions, based on the data time range, optimizes analysis of the time series data.

12. The computer program product of claim 10 wherein the computer readable program code configured to present the snapshot of the time series data, in response to the request, by partitioning, by the computing processor, the virtual relational database table into the plurality of virtual partitions according to the user defined time interval is further configured to:
incrementally refresh the corresponding time series data by extracting new time series data from the non-relational time series database table, according to the user defined time interval;
create a new virtual partition that spans the user defined time interval, the new virtual partition having a new respective partition time range; and
add the new virtual partition to the plurality of virtual partitions.

13. The computer program product of claim 10 wherein the computer readable program code configured to present the snapshot of the time series data, in response to the request, by partitioning, by the computing processor, the virtual relational database table into the plurality of virtual partitions according to the user defined time interval is further configured to:
incrementally refresh the corresponding time series data by identifying the data time range as representing a chosen view of the time series data, wherein the chosen view comprises a subset of the plurality of virtual partitions, wherein each of the subset of the plurality of virtual partitions has a second respective partition time range that is within the data time range.

14. The computer program product of claim 13 wherein the computer readable program code is further configured to:
detect a first virtual partition, within the subset of the plurality of virtual partitions, having a first partition time range outside of the data time range; and
remove the first virtual partition from the subset of the plurality of virtual partitions, wherein the first virtual partition is no longer represented within the chosen view.

15. The computer program product of claim 13 wherein the computer readable program code is further configured to:
detect a second virtual partition having a second partition time range within the data time range, wherein the second virtual partition is not in the subset of the plurality of virtual partitions; and
add the second virtual partition to the subset of the plurality of virtual partitions, wherein the second virtual partition is now represented within the chosen view.

16. The computer program product of claim 10 wherein the computer readable program code configured to present the snapshot of the time series data, in response to the request, by partitioning, by the computing processor, the virtual relational database table into the plurality of virtual partitions according to the time interval is further configured to:
- create a partitioning calendar;
- associate the user defined time interval to the partitioning calendar;
- assign the partitioning calendar to the virtual table; and
- partition the virtual relational database table, using the partitioning calendar, wherein each partition spans the user defined time interval.

17. The computer program product of claim 10 wherein the computer readable program code configured to present the snapshot of the time series data, in response to the request, by partitioning, by the computing processor, the virtual relational database table into the plurality of virtual partitions according to the user defined time interval is further configured to:
- define a time window selected to optimize an amount of relevant data that is loaded into the snapshot;
- associate the time interval to the time window; and
- apply the time window to the virtual relational database table to partition the virtual relational database table into the plurality of virtual partitions according to the user defined time interval.

18. The computer program product of claim 10, wherein the time series data in the non-relational time series database table is not accessible using relational database queries, wherein the computer readable program code is further configured to:
- provide access to the time series data in the non-relational time series database table through the request issued for the virtual relational database table.

19. A system comprising:
- a processor; and
- a computer readable storage medium operationally coupled to the processor, the computer readable storage medium having computer readable program code embodied therewith to be executed by the processor, the computer readable program code configured to:
- identify, by the computing processor, a non-relational time series database table comprising time series data, wherein the non-relational time series database table comprises a column containing an array of the time series data collected from at least one source, wherein as new time series data is collected from the at least one source, the new time series data is added to the array instead of adding anew row for the new time series data;
- create, by the computing processor, a virtual view of the time series data in the non-relational time series database table by representing the time series data in the non-relational time series database table as a virtual relational database table, wherein the virtual view is stored as an in-memory storage structure without any intermediate storage, wherein the time series data is stored in the non-relational time series database table and not stored in a relational database table;
- receive a request with a user defined time interval to view the time series data, wherein the request is an SQL request; and
- present a snapshot of the time series data, in response to the request, by partitioning, by the computing processor, the virtual relational database table into a plurality of virtual partitions according to the user defined time interval across a data time range, wherein each of the plurality of virtual partitions has a respective partition time range that spans the user defined time interval, the plurality of virtual partitions created to optimize loading of the time series data in the virtual view into the snapshot by incrementally refreshing corresponding time series data for a corresponding virtual partition within the data time range.

20. The system of claim 19 wherein the computer readable program code is further configured to:
- provide, by the computing processor, the plurality of virtual partitions to the snapshot for analysis of the time series data via a data accelerator, wherein selection of the plurality of virtual partitions, based on the data time range, optimizes analysis of the time series data.

21. The system of claim 19 wherein the computer readable program code configured to present the snapshot of the time series data, in response to the request, by partitioning, by the computing processor, the virtual relational database table into the plurality of virtual partitions according to the user defined time interval is further configured to:
- incrementally refresh the corresponding time series data by extracting new time series data from the non-relational time series database table, according to the user defined time interval;
- create a new virtual partition that spans the time interval, the new virtual partition having a new respective partition time range; and
- add the new virtual partition to the plurality of virtual partitions.

22. The system of claim 19 wherein the computer readable program code configured to present the snapshot of the time series data, in response to the request, by partitioning, by the computing processor, the virtual relational database table into the plurality of virtual partitions according to the user defined time interval is further configured to:
- incrementally refresh the corresponding time series data by identifying the data time range as representing a chosen view of the time series data, wherein the chosen view comprises a subset of the plurality of virtual partitions, wherein each of the subset of the plurality of virtual partitions has a second respective partition time range that is within the data time range.

23. The system of claim 19, wherein the time series data in the non-relational time series database table is not accessible using relational database queries, wherein the computer readable program code is further configured to:
- provide access to the time series data in the non-relational time series database table through the request issued for the virtual relational database table.

* * * * *